(No Model.)

J. F. PALMER.
VALVE FOR PNEUMATIC TIRES.

No. 512,518. Patented Jan. 9, 1894.

Witnesses:
Chas. E. Gaylord
E. R. Shipley

Inventor:
John F. Palmer,
By Dyrenforth & Dyrenforth
Attys.

UNITED STATES PATENT OFFICE.

JOHN FULLERTON PALMER, OF RIVERSIDE, ILLINOIS.

VALVE FOR PNEUMATIC TIRES.

SPECIFICATION forming part of Letters Patent No. 512,518, dated January 9, 1894.

Application filed May 20, 1893. Serial No. 474,893. (No model.)

*To all whom it may concern:*

Be it known that I, JOHN FULLERTON PALMER, a citizen of the United States, residing at Riverside, in the county of Cook and State of Illinois, have invented a new and useful Improvement in Valves for Pneumatic Tires, of which the following is a specification.

My invention relates to an improvement in valves for pneumatic tires, and the object of my invention is to improve the construction of valves for this purpose in the line of simplicity of construction and certainty of operation. It is found necessary, as a rule, to make the valve through which pneumatic tires are charged with air in part at least of a material which will withstand the heat of vulcanization, and which may by vulcanization be firmly secured to a rubber tube through which connection is made with the inner tube of the tire. It is also found desirable to make the valve in separable parts, the main air tube being vulcanized in the rubber tube previously mentioned, while the valve stem and piston, and the nut and tube which carry them, are of a nature to be applied to the main tube after the latter has been secured to the tire. My invention embodies these features, but differs in material respects, as hereinafter described, from valves as heretofore constructed in the matter of the interior arrangement of parts.

My invention consists in the general and specific construction and combination of parts, all as hereinafter more fully set forth.

Figure 1:
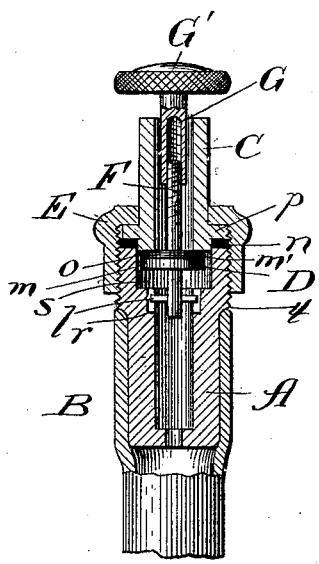
Figure 3:
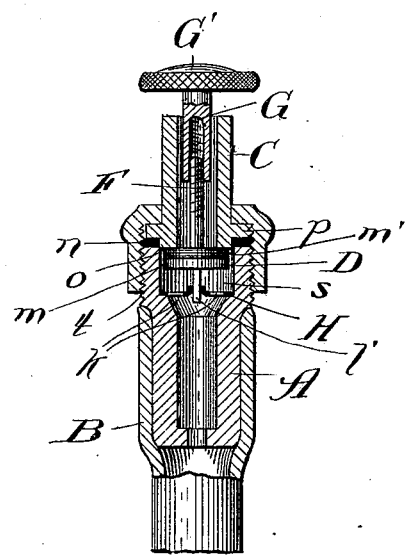
Figure 2:
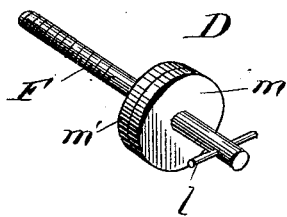
Figure 4:
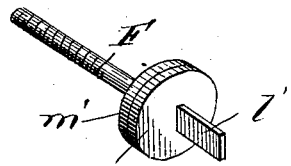
Figure 5:
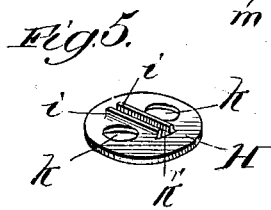

In the drawings—Figure 1 is a vertical central section of a valve constructed in accordance with my invention. Fig. 2 is a perspective view of the valve piston and stem. Fig. 3 is a central vertical section taken through a valve embodying a modified form of my invention. Fig. 4 is a perspective view of the valve, piston and stem employed with the form shown in Fig. 3, and Fig. 5 is a perspective view of the washer employed with the valve shown in Fig. 3.

The difference in construction between the forms of valve shown in Figs. 1 and 3 is minor, and while the form shown in Fig. 1 is preferable in some respects, that shown in Fig. 3 may be preferred under arbitrary conditions relating to the facilities for manufacture. In principle and in operation the forms are identical.

A represents the valve tube proper, the upper end of which is enlarged and provided with screw-threads as shown at $t$. Around the lower or reduced part of the tube A the upper end of the rubber tube B is applied and caused to adhere by vulcanization. The bore of the tube A is enlarged in diameter at the upper end, as shown at $s$. In the structure shown in Fig. 1 the walls of the bore below the enlarged part $s$ are notched or cut away as shown at $r$ to provide short vertical recesses for a purpose presently to be described. The remainder of the valve comprises the tube C having a bore less in diameter than the chamber $s$ of the section B, and having the annular external flange $p$. The lower end $o$ of the tube C thus presents a shoulder or seat to the piston valve D. A nut E embraces the tube C and is internally screw-threaded to engage the screw-threads $t$ on the section A, the arrangement being such that as the nut E is turned down it binds against the flange $p$, and serves to hold the tubes C and A together. A rubber washer $n$ is placed upon the inner end of the tube A between it and the outer side of the flange $p$, and serves to produce an air-tight joint at this point.

The valve piston D comprises the usual piston $m$ having the facing of rubber $m'$. The stem F extends centrally through the piston to project from both faces thereof. The upper projecting part of the stem is screw-threaded, while the lower projecting part is provided with a transverse pin $l$ of a length and dimension to fit in the notches $r$ formed in the bore of the tube A. Into the outer end of the tube C is introduced the internally screw-threaded sleeve G, surmounted with the thumb-nut G'. The tube G has an external diameter less than the internal bore of the tube C, and receives the upper screw-threaded end of the stem F.

The structure of Fig. 3 is identical with that of Fig. 1 in all particulars, except that the notches $r$ are omitted, and in their place there is introduced into the enlarged part $s$ of the bore of the tube A a flat washer H, having two perforations $k$, more or less, to permit the air to pass through, and a central elongated slot $k'$, the washer being introduced in such a manner as to be immovable; and it differs from the structure of Fig. 1 in the further particular that the lower projecting end of the piston stem F instead of being provided with the transverse pin $l$ is made flat as shown at $l'$, and given a lateral dimension to fit easily in the slot $k'$ of the washer. The object of the pin $l$ and notches $r$ and of the flattened character of the end $l'$ of the stem and the slot $k'$ is identical, namely, to prevent turning of the piston stem while permitting it to be vertically moved without obstruction.

The parts being adjusted together, the operation is as follows: To fill the pneumatic tire with air the sleeve G is entirely withdrawn from the valve, and the nozzle of an ordinary air-pump applied to the outer end and set in operation. The incoming air forces the piston D from the seat afforded by the lower end $o$ of the tube C, and the piston being of less diameter than the enlarged part $s$ of the tube D the air passes around the same, and into the tube A, and thus into the tire. In order that the piston shall not close the passage by its engagement with the lower wall of the enlarged part $s$ of the bore of the tube A the pin $l$ in the case of Fig. 1 is located in such position with relation to the piston and the lower extremity of the notches $r$ that it will engage the lower extremity of the notches before the piston reaches the lower wall of the enlargement $s$, thus leaving a passage along the under face of the piston for the air. In the case of the structure of Fig. 3 a similar provision is made by striking up the metal of the washer H which forms the slot $k'$ to leave the upward projecting lips $i$, against which lips the piston bears to leave a passage on its under side for the air. The pressure of air in the pneumatic tire causes the piston D normally to seat against the lower end of the tube C. When the tire is sufficiently charged, and the pump removed, the sleeve G is again applied, and being turned downward until the thumb-nut engages the outer extremity of the tube, further turning serves to tighten the piston B upon the seat $o$, and thus prevent leakage of the valve at this point.

What I claim as new, and desire to secure by Letters Patent, is—

1. The air valve for pneumatic tires, comprising in combination the tube-sections A and C, and means for holding them together, the tube A provided with the enlarged bore $s$, piston D having the stem F and means for raising and lowering it with relation to the tube, said stem passing through the piston and made on its under side wider than its thickness, and a confined passage in the tube section A adapted to receive the lower projecting part of the piston stem to prevent the latter from turning while permitting its vertical movement, substantially as described.

2. The combination with the tube sections A, C constructed and held together as described, piston D, piston stem F, sleeve G and nut G', the tube section A having the enlarged bore $s$ and notches $r$ of the pin $l$ extending through the lower projecting end of the piston stem and into the notches, substantially as and for the purpose set forth.

JOHN FULLERTON PALMER.

In presence of—
P. W. LEAVITT,
W. J. O'NEIL.